No. 681,090. Patented Aug. 20, 1901.
T. WHITE.
SHAFT AND PULLEY COUPLING.
(Application filed May 22, 1901.)
(No Model.)

Witnesses
C. F. Kilgore
V. R. H. Thomb.

Inventor
Tilman White
Harry R. Williams
Attorney

UNITED STATES PATENT OFFICE.

TILMAN WHITE, OF JACKSONVILLE, FLORIDA.

SHAFT AND PULLEY COUPLING.

SPECIFICATION forming part of Letters Patent No. 681,090, dated August 20, 1901.

Application filed May 22, 1901. Serial No. 61,392. (No model.)

*To all whom it may concern:*

Be it known that I, TILMAN WHITE, a citizen of the United States, residing at Jacksonville, in the county of Duval and State of Florida, have invented certain new and useful Improvements in Shaft and Pulley Couplings, of which the following is a specification.

This invention relates to a coupling which is designed to secure a pulley or gear to a shaft without the insertion of a key.

The object of the invention is to provide a simple and inexpensive coupling upon which a pulley or gear may be slipped and very securely held to the shaft by means of powerful longitudinally movable wedges.

The embodiment of the invention that is illustrated in the accompanying drawings has a shell formed of three segmental pieces, with an interior diameter slightly larger than the diameter of the shaft and an exterior diameter slightly smaller than the opening through the pulley or gear. Each segment has a longitudinal mortise in which is a wedge with a toothed face bearing against the shaft and a coöperating wedge with a toothed face bearing against the walls of the opening, the latter wedge having a threaded shank, with a nut arranged to bear against the end of the segment and move the outer wedge longitudinally with relation to the inner wedge, and thus cause a variation in their combined thickness.

Figure 1:
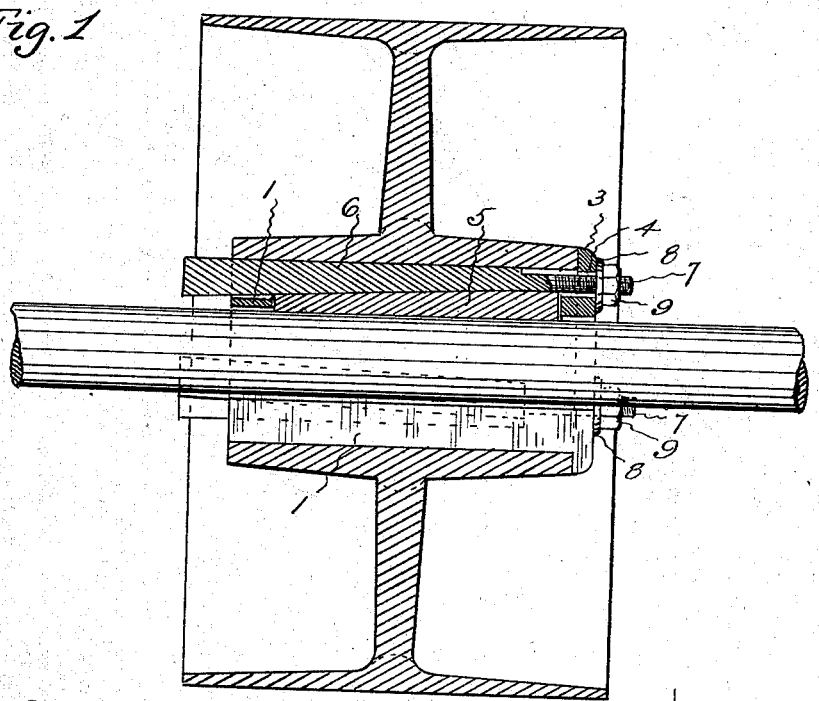
Figure 2:
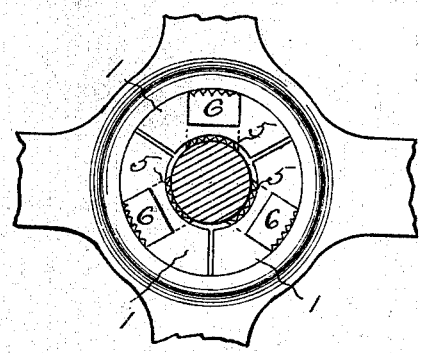
Figure 3:
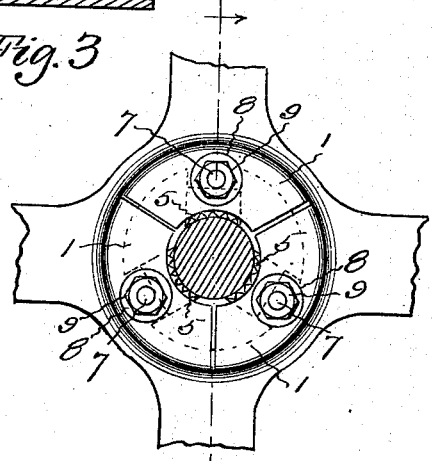
Figure 4:
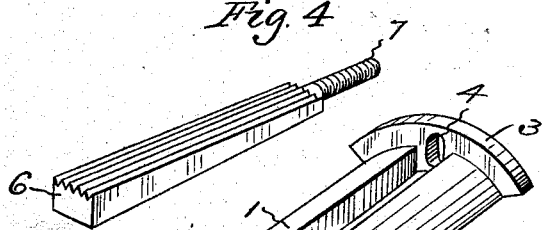
Figure 4:
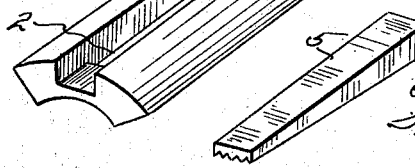

Figure 1 of the drawings shows a sectional view of a pulley fastened to a shaft by one of the couplings. Fig. 2 shows a view of one end of the coupling and a portion of the pulley. Fig. 3 shows a view of the other end of the coupling and a portion of the pulley, and Fig. 4 shows perspective views of one segment and the two wedges with which each segment is provided.

Each segment 1 of the shell has a longitudinal mortise 2, that opens through the shell, and at one end a portion of a flange 3, through which is perforation 4. The concave surface of each segment is made on the arc of a circle slightly larger than the circle of the shaft on which the coupling is to be used. The convex surface of each segment is made on the arc of a circle slightly smaller than the circle of the opening through the pulley or gear that is to be secured by the coupling to the shaft. In the inner part of the mortise in each segment is a loose wedge 5, the inside face of which has longitudinally-extending V-shaped teeth. In the outer part of the mortise in each segment is a loose wedge 6, the outside face of which has longitudinally-extending V-shaped teeth. Projecting from the smaller end of each of the outer wedges is a threaded shank 7, which when the wedge is in place extends through a perforation in the flange of the segment. Upon each shank outside of the flange is a washer 8 and a nut 9.

This coupling is placed about a shaft and a pulley or gear slipped upon the segments which form the shell. By screwing up the nuts with an ordinay wrench the outer wedges are drawn longitudinally with relation to the inner wedges and the combined thickness increased, causing the toothed outer face of the outer wedge to bite against the wall of the opening through the pulley or gear and the toothed inner face of the inner wedge to bite against the shaft. The wedges are flat and the screw-threads fine, and as a result of this a powerful wedging action can be effected between three sides of the shaft and the pulley or gear, and the teeth of the respective wedges will set into the shaft and into the pulley or gear, so that neither can rotate independently of the other. By unscrewing the nuts the pulley or gear may be loosened from the shaft.

This coupling is very simple to manufacture and easy to manipulate. It can be made in various sizes and used to securely fasten pulleys or gears to shafts without requiring any machine-work to be done upon either the shafts or the pulleys or gears.

I claim as my invention—

1. A coupling consisting of a segmental shell, each segment of the shell having a wedge adapted to bear inwardly, and a wedge adapted to bear outwardly, and means for drawing one of the wedges in each segment longitudinally whereby the wedges are caused to expand or contract radially, substantially as specified.

2. A coupling consisting of a segmental shell, each segment having a longitudinal mortise, an inwardly-facing wedge and an outwardly-facing wedge located in each mortise, and means for moving one of the wedges in each segment longitudinally and causing the wedges to expand radially, substantially as specified.

3. A coupling consisting of a segmental shell, each segment having a wedge with longitudinally-extending teeth on its inner face and a wedge with longitudinally-extending teeth on its outer face, and means for moving one of the wedges in each segment longitudinally and causing the wedges to expand radially, substantially as specified.

4. A coupling consisting of a segmental shell, each segment having a longitudinal mortise and a section of a flange with a perforation through the flange, a wedge with longitudinally-extending teeth on its inner face and a wedge with longitudinally-extending teeth on its outer face loosely held in the mortise in each segment, each outer wedge having a threaded shank extending through the perforation in the flange of its segment, and a nut turning on the threaded shank of each outer wedge for causing the outer wedges to move longitudinally and expand and contract radially, substantially as specified.

TILMAN WHITE.

Witnesses:
H. A. HODGES,
A. W. BAUS.